US006487717B1

(12) United States Patent
Brunemann et al.

(10) Patent No.: US 6,487,717 B1
(45) Date of Patent: Nov. 26, 2002

(54) SYSTEM AND METHOD FOR TRANSMISSION OF APPLICATION SOFTWARE TO AN EMBEDDED VEHICLE COMPUTER

(75) Inventors: George Brunemann, Guilford, IN (US); Thomas A. Dollmeyer, Columbus, IN (US); Joseph C. Mathew, Columbus, IN (US)

(73) Assignee: Cummins, Inc., Columbus ( * ) Notice: Subject to any disclaimer, the term of this patent is extended or adjusted under 35 U.S.C. 154(b) by 0 days.

(21) Appl. No.: 09/232,104

(22) Filed: Jan. 15, 1999

(51) Int. Cl.⁷ .................................................. G06F 9/44
(52) U.S. Cl. .................... 717/173; 709/217; 701/29
(58) Field of Search ....................... 717/3, 11, 168–178;
702/183; 701/29, 31, 33, 208, 211, 213,
201; 709/203, 216–223; 379/185; 370/401,
392, 466; 455/11.1, 66, 95, 99, 208, 211,
223, 224, 426, 556, 557; 707/203

(56) References Cited

U.S. PATENT DOCUMENTS

| | | | |
|---|---|---|---|
| 4,998,205 A | | 3/1991 | Ricard |
| 5,303,163 A | | 4/1994 | Ebaugh et al. |
| 5,365,436 A | | 11/1994 | Schaller et al. |
| 5,398,336 A | | 3/1995 | Tantry et al. |
| 5,400,018 A | | 3/1995 | Scholl et al. |
| 5,408,412 A | | 4/1995 | Hogg et al. |
| 5,442,553 A | | 8/1995 | Parrillo |
| 5,509,123 A | | 4/1996 | Dobbins et al. |
| 5,548,756 A | | 8/1996 | Tantry et al. |
| 5,619,412 A | | 4/1997 | Hapka |
| 5,623,605 A | | 4/1997 | Keshev et al. |
| 5,710,883 A | | 1/1998 | Hong et al. |
| 5,732,074 A | | 3/1998 | Spaur et al. |
| 5,999,740 A | * | 12/1999 | Rowley ........................ 395/712 |
| 6,154,658 A | * | 11/2000 | Caci ............................. 455/466 |
| 6,169,897 B1 | * | 1/2001 | Kariya ......................... 455/426 |
| 6,181,994 B1 | * | 1/2001 | Colson et al. ................ 701/33 |
| 6,199,099 B1 | * | 3/2001 | Gershman et al. .......... 709/203 |
| 6,202,023 B1 | * | 3/2001 | Hancock et al. ............ 701/201 |
| 6,208,948 B1 | * | 3/2001 | Klingler et al. ............. 702/183 |
| 6,246,688 B1 | * | 6/2001 | Angwin et al. .............. 370/401 |
| 6,263,268 B1 | * | 7/2001 | Nathanson ................... 701/29 |
| 6,263,497 B1 | * | 7/2001 | Maeda et al. ................. 717/11 |

OTHER PUBLICATIONS

No Author, "Speed and accuracy from PC–based controls", Tooling and Production, Jan. 1998, pp 39–43.*

* cited by examiner

Primary Examiner—Kakali Chaki
(74) Attorney, Agent, or Firm—Barnes & Thornburg

(57) ABSTRACT

A system and method for controlling an engine or machine at a remote unit from a central office, which may be a fixed location, contemplates a transmit/receive interface connected to the computer or microprocessor of the engine or machine controller. This interface is integrated with a communications module that is configured to establish communications with a World Wide Web server on the Internet. A similar system is established at the location of the central office connected to a computer controlled by a fleet owner/operator, for example. The fleet owner can upload machine control data or machine control application software to an intermediate digital file storage maintained by the Web server via the Internet. This data or application software can be accessed and downloaded at any time by the remote operator without any direct interface or communication with the central office. The remote machine controller includes a data entry device that allows the remote operator to issue commands to the Web server to upload or download information, input password or security information for access to the data in intermediate file storage, or leave messages for the central office. The transmit/receive interface at the remote unit includes means for receiving the downloaded information, determining whether the information is application data or application software, and updating the machine controller accordingly. In this manner, either specific data can be downloaded to modify the performance of the controlled machine, or entirely new application software or modified application software can be downloaded directly to the machine controller.

4 Claims, 4 Drawing Sheets

SYSTEM AND METHOD FOR TRANSMISSION OF APPLICATION SOFTWARE TO AN EMBEDDED VEHICLE COMPUTER

BACKGROUND OF THE INVENTION

The present invention relates generally to remote machine control systems utilizing embedded or on-board computers or microprocessors for controlling various aspects of the machine's performance and activity. More specifically, the invention concerns a system and method for modifying the operating data and functions of the embedded computer by remote communications access. The present invention has particular applicability to remote vehicles, such as long haul trucks and off-road vehicles, and to the control modules embedded within those vehicles for controlling on-board machines, such as the vehicle engine.

Remote monitoring of the operation and location of vehicles has been widely implemented by owners and operators of vehicle fleets. This remote monitoring function has been utilized in a wide range of applications, such as long haul trucks, off-road construction vehicles, and even mobile generator sets. In all of these applications, an internal combustion engine is controlled by an embedded or on-board computer or microprocessor, referred to as an engine control module (ECM). The typical ECM contains a series of application software programs stored in memory that are executed to control and monitor various functions and activities for the engine and/or vehicle. For example, for a long-haul truck, the ECM will control fuel delivery to the engine cylinders as well as the ignition timing. The same functions can be performed by an ECM utilized within an off-road construction vehicle or a generator set to monitor and control the engine performance.

Moreover, in other varied applications, a machine controller is utilized to control and monitor the function and operation of other powered machinery. For instance, in a long haul refrigerator truck, the refrigeration unit can also be controlled by an on-board microprocessor or computer. Similarly, modern electronically controlled vehicle transmissions include a microprocessor that can control the transmission shift points according to stored application programs.

In all of these cases, the vehicle or machine that is being controlled by the embedded computer is typically at a remote location from the central office of the fleet's owner/operator. Nevertheless, the fleet operator has a continuing interest in not only monitoring the performance and activity of the fleet vehicles or machines, but also in controlling their operation. One example of this form of remote control is disclosed in U.S. Pat. No. 5,619,412, owned by the Assignee of the present invention. In the '412 patent, engine idle time is remotely controlled by signals transmitted over an RF link or satellite using an on-board radio-telephone. In general terms, the system of the '412 patent allows a fleet operator to have real-time access to the ECM of the vehicle to change engine idle parameters. The system shown in this patent is essentially interactive, requiring immediate interface between the vehicle operator at the remote location and the fleet owner at the central office or fixed central office.

The remote control system shown in the '412 patent has given the fleet owner/operator a greater degree of control over the vehicles in the fleet. One drawback of this system, however, is that it requires some direct or real-time communication between the vehicle operator and the fleet owner, which requires coordination between the two parties. In some instances, the vehicle operator may require a change or upgrade to certain ECM routines at a time when the central office is unavailable to effect the transfer of information. Another limitation of the systems of the prior art, such as that shown in the '412 patent, is that direct communication with each vehicle in the fleet is required. In many cases, the fleet of vehicles is numerous, which greatly complicates the logistics of making fleet-wide changes to the engine control modules.

Consequently, there is a need for a system and method that permits a greater degree of flexibility in uploading and downloading information to and from an ECM or machine controller. This need extends beyond the interests of a vehicle fleet owner to virtually any remotely operating machinery that is controlled by an associated microprocessor or computer based controller.

SUMMARY OF THE INVENTION

In order to address this need, the present invention contemplates a system and method for controlling an engine or machine at a remote location from a central office, which may be a fixed location. The system contemplates a transmission/reception interface connected to a computer or microprocessor of the particular controller. This interface is integrated with a communications module that is configured to establish communications with a World Wide Web server over the Internet. The invention further contemplates a similar system at the location of a base site, or central office, connected to a computer controlled by a fleet owner/operator, for instance.

In accordance with one aspect of the invention, the central office can download machine control data or machine control application software to a memory maintained by the Web server via the Internet. This data can be downloaded at any time by the fleet owner without any interface with the remote vehicle/machine operator. A file storage protocol can be implemented utilizing passwords and differing levels of security to ensure that the information is accessed only by certified remote operators.

In a further feature of the invention, the remote operator can access the stored information by connecting to the Web server via the Internet. This connection can be established at any time by the remote vehicle/machine operator. Preferably, the remote machine controller includes a data entry device that allows the remote operator to issue commands to the Web server to upload or download information, input password or security information for access to the data, or leave messages for the fleet owner/operator. In preferred embodiments, the fleet operator or central office can maintain a web page that can be accessed by the remote operator. The web page can include links that allow the remote operator to access desired information for download, for example.

The invention contemplates that the transmit/reception interface provides means for receiving the downloaded information, determining whether the information is application data or application software, and updating the machine controller accordingly. In this manner, either specific data can be downloaded to modify the performance of the controlled machine, or entirely new or modified application software can be downloaded directly to the machine controller.

One benefit of the system and method of the present invention is that direct communication between the fleet owner/operator and the remote vehicle/machine operator is not required. A further benefit is that the remote operator can access essential ECM or machine controller information at any time and at any location.

It is one object of the present invention to provide a system and method for controlling a remote machine or vehicle that provides a high degree of flexibility in its use. Another object is achieved by features of the inventive system and method that allow intermediate storage of both application data and application software for eventual downloading and use by the remote operator.

Other objects and benefits of the present invention can be readily discerned from the following written description and accompanying figures.

DESCRIPTION OF THE PREFERRED EMBODIMENTS

Figure 1:
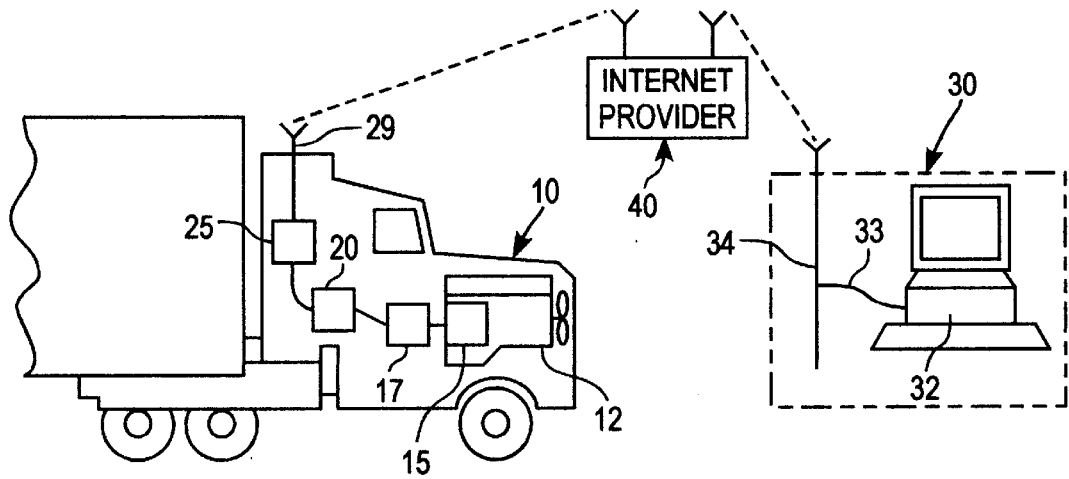
FIG. 1 is a representation of the system for controlling a remote machine according to one embodiment of the present invention.

For the purposes of promoting an understanding of the principles of the invention, reference will now be made to one preferred embodiments illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

A system for controlling a remote machine in accordance with one embodiment of the present invention is shown in FIG. 1. In this embodiment, the remote unit 10 is a vehicle, such as a long-haul truck. The machine 12 within the vehicle 10 is an internal combustion engine. In this embodiment, the engine 12 is controlled by a machine controller 15, which controls various mechanisms of the engine 12, such as the fuel injectors and spark plug (for a spark ignition engine).

The vehicle includes a computer or microprocessor 17 that transmits signals to the machine controller 15 in accordance with a sequence of commands maintained in various application software. In this embodiment, the microprocessor 15 can be part of an engine control module (ECM) that can be of known design. The vehicle 10 further includes a remote interface device 20 that is connected between the microprocessor 17 and a communications module 25. The communications module 25 is operable to establish a communications connection by way of a transmit/receive link 29.

A central office 30 is also provided that includes a computer, such as PC 32. The central office 30 is preferably at the fixed location of the fleet owner/operator. Alternatively, the central office 30 itself can be mobile, depending on the nature of the fleet operations. The PC can be a desktop or portable unit provided that it is equipped for Internet communication. The PC 32 is connected to a communication link 34 by way of a modem line 33. The communication link can be a telephone land line or cellular link. Preferably, the PC 32 includes an internal or external modem capable of transmitting and receiving data over a phone line.

The remote unit 10 and the central office 30 are linked through an Internet provider 40. Specifically, each of the remote unit 10 and central office 30 has the capability for establishing an Internet connection to a World Wide Web server through an Internet provider 40. This WWW server provides for intermediate storage of information, such as data and applications, transferred to and from the remote unit 10 and the central office 30.

In accordance with the embodiment shown in FIG. 1, the remote unit 10 and central office 30 do not directly communicate with each other. Instead, indirect communication of data and applications is achieved by interfacing through the Web server and its file storage capabilities. For example, the fleet owner/operator can maintain a web site that can be accessed by any remote unit 10. The web site can convey information generic to the entire fleet or specific to a particular remote unit operator. The fleet web site can include links that allow the remote unit operator and the central office owner/operator to access intermediate file storage capabilities.

Figure 2:
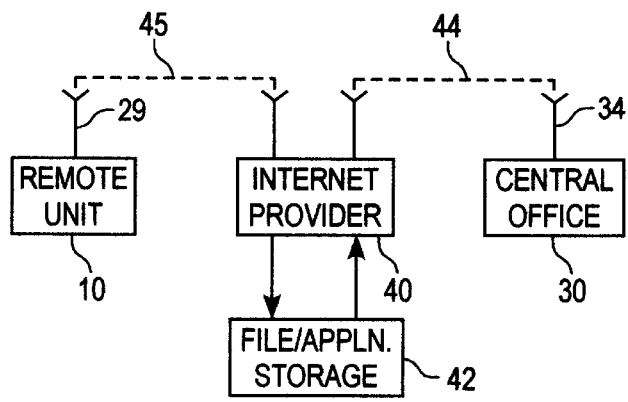
FIG. 2 is a block diagram depicting the communications link between a remote unit or machine and a central office or base site, in accordance with the present invention.

In one implementation of the present invention, the operator of the remote unit 10 can establish an Internet connection, access the fleet web site, and download performance data from the memory of the microprocessor 17 to file storage at the Web server. This path is schematically depicted in FIG. 2. Specifically, the remote unit 10 communicates by way of its transmit/receive link 29 to establish a file transfer link 45 with the Internet provider 40. The transmitted data is then stored in intermediate file storage 42 maintained by the Web server. The operator at the central office 30 can later establish a transfer link 44 by way of the central office communication link 34. At this point the central office can access the information maintained in the intermediate file storage 42 by way of the Internet provider 44 and associated Web server.

The present invention contemplates that the intermediate storage 42 can be used to store a variety of digital information. For example, the information can comprise the engine performance data described above. The stored files can also include data to be used by the microprocessor 17 in directing the machine controller 15. Moreover, machine control application software can be maintained within the intermediate file storage 42. In this way, the fleet owner/operator can provide upgrades to machine operating data, as well as to machine operating algorithms. At the same time, the central office 30 can receive data from the remote unit 10 to evaluate the performance of the unit and particularly the machine 12.

It is further contemplated that the fleet web site can control the level of access by any particular remote unit operator. For example, if the fleet owner disseminates a generic set of updated data to be used by all operators of fleet vehicles, the security level can be established so that all of the fleet unit operators can access the data. On the other hand, certain vehicles may require specific upgrades or modifications to its data and/or application software. Thus, a higher level security can be maintained for that data, which may require an operator specific password for access and downloading.

A further level of security can be implemented through the web page that restricts access to certain information in the intermediate file storage 42 to a single instance. For example, changes in data or application software for an ECM may be associated with maintaining specific emissions levels for an internal combustion engine. If it is known that a particular fleet vehicle is being operated in a region having reduced emissions requirements, the vehicle operator can download data to modify the performance of the engine of the remote vehicle. Once this data has been downloaded, it is probably desirable that the information be inaccessible to the remote operator, since emissions requirements in other locations may be more stringent. Thus, the invention contemplates an additional level of restriction that can effectively delete data from the intermediate file storage 42 once it has been accessed by a remote user.

Figure 3:
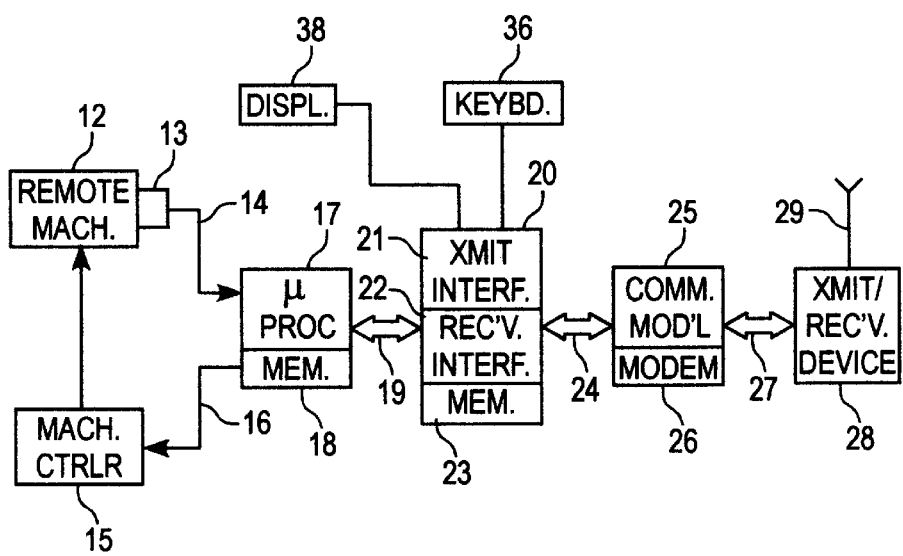
FIG. 3 is a block diagram of the components of the system shown in FIG. 1 associated with the remote machine.

Referring now to FIG. 3, details of the components of the remote unit 10 are depicted. Specifically, a machine controller 15 directs the manner of operation of the remote machine 12. A monitoring device 13 can be included which monitors the performance of the machine 12 and feeds data 14 to the microprocessor 17. The microprocessor 17 can supply control signals 16 to the machine controller 15 directing its operation in accordance with a series of algorithms maintained in the memory 18 of the microprocessor 17. In the illustrated embodiment, the microprocessor 17 is an engine control module that includes various algorithms for monitoring and controlling the operation of an internal combustion engine. As expressed above, it is understood that the microprocessor 17 and the machine controller 15 can be utilized to control machines 12 other than a vehicle engine.

A data bus 19 is provided between the microprocessor 17 and the remote interface device 20. This data bus provides for reception/transmission of data to and from the microprocessor 17. The remote interface device 20 includes a transmission interface module 21 and a reception interface module 22. The interface device 20 also maintains a local memory 23. Preferably, the remote interface device 20 is a microprocessor that is capable of storing and executing a sequence of commands to transmit, receive and condition or translate information passing between the microprocessor 17 and the Internet provider 40.

A second data bus 24 connects the remote interface device 20 to a communications module 25. The module 25 preferably includes a modem 26 that is capable of high-speed data communication. The communications module 25 transmits information over a data link 27 to the transmit/receive device 28. Preferably, the device 28 is a cellular phone that allows the operator of the remote unit 10 to access the Internet provider 40 at virtually any location accessible to a cellular link. The transmit/receive link 29 can then be the antenna associated with the cellular phone 28. Alternatively, the transmit/receive device 28 and link 29 can be a direct link to a ground-based telephone line, such as through a J1587 or RS232 jack.

As indicated above, the remote interface device 20 is preferably a microprocessor-based device, and most preferably a personal computer. In the preferred embodiment, the PC 20 includes a data entry component, such as a keyboard 36. The keyboard 36 can be used to issue commands over the transfer link 45 to the Web server to effectuate the uploading/downloading of information to and from the intermediate file storage 42. Although the specific illustrated embodiment uses a keyboard as input device 36, other types of data entry components are contemplated. For example, a formatted keypad can be provided with predetermined keys assigned to specific functions. Another data entry device can be in the form of a touch screen on a display 38 associated with the remote interface device 20.

The present invention contemplates the transfer of information or files to and from the remote unit 10 and the intermediate file storage 42 associated with a Web server. The transmission of digital information between these two locations can be accomplished according to a variety of protocols. In one specific embodiment, the FTP (file transfer protocol) format is utilized. The FTP format is one standard protocol for transferring data over the World Wide Web. Other protocols can be implemented, such as TCP/IP.

Figure 4:
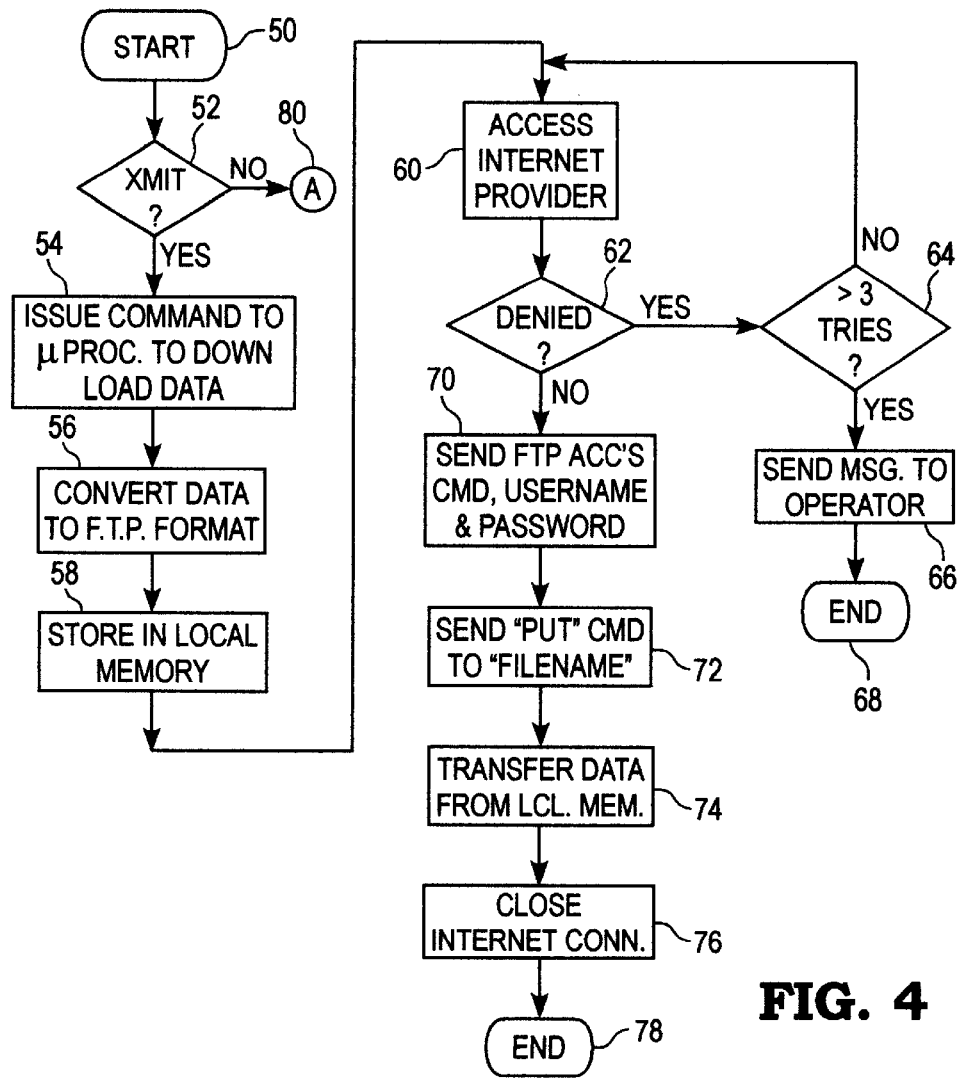
FIG. 4 is a flow chart of steps executed to download data from either the remote machine or the base location for intermediate storage using the FTP protocol format.

The flow chart of FIG. 4 depicts the sequence of steps executed by the remote interface device 20 to implement the FTP transfer. At the start 50 of the routine, a determination is made in decision block 52 whether the device 20 is being used to transmit or to receive information. If the operator of the remote unit 10 indicates that transmission of data from the microprocessor 17 is to occur, the program control passes to step 54. At this point a command is issued to the microprocessor 17 to download specific data from its own memory 18. In the case of an engine control module, software applications monitor data signals 14 generated by the monitoring device(s) 13 and store this data in memory 18. In a typical use of a conventional ECM, this data is accessed by way of a hand-held unit used by a diagnostics technician. For the purposes of the present invention, the same form of data transfer can be used to transfer the data on bus 19 to the remote interface device 20 in response to the command in step 54. Software maintained in the transmit interface 21 of the remote interface device 20 can emulate the data transfer of the conventional hand-held unit to extract the data 14 from the ECM memory 18.

In the next step 56, the data received from the microprocessor 17 is converted to an FTP protocol format. The FTP format is well known in the field of Internet data transfer. The FTP formatted data is stored in the local memory 23 of the remote interface device 20 in step 58 in anticipation of eventual transfer over the Internet.

In the following step 60, the Internet provider is accessed by way of the communications module 25. This access can involve action by the operator of the remote unit 10, or can occur automatically, depending upon the hardware and software incorporated into the interface device 20, communications module 25 and transmit/receive device 28. In one specific embodiment, the unit operator can be prompted to establish a telephone communication over the cellular phone 28. If the attempt to access the Internet provider is denied in the conditional step 62, connection is attempted three times, as set forth in conditional step 64. If the link to the Internet provider is not established, a message is sent to the unit operator in step 66 and the routine is ended at step 68.

On the other hand, if connection to the Internet provider is established, the routine implemented by the interface device 20 passes to step 70. In this step, an FTP access command is transmitted, together with a user name and password that permits access to the intermediate file storage 42. In accordance with the FTP protocol, a "put" command is issued in step 72 to store the data downloaded from the microprocessor 17 into the local memory 23. The "put" command stores the data in a file named "filename", which can be defined according to any naming convention established by the fleet operator. When the "put" command is issued, the file is transferred in step 74 from local memory 23 over the Internet link and stored in the intermediate storage 42. At this point, the Internet connection can be closed at step 76 and the command sequence terminated in step 78.

If the initial conditional step 52 is answered that reception of data is contemplated, control passes to step 80. Again, connection to the Internet provider is attempted in step 82, with conditional steps 84 and 86 coming into play if the Internet link is not established within three tries. As above, if the connection cannot be made, an error message is sent to the operator in step 88 and the program terminates in step 90. However, if the Internet connection is established, control passes to step 92 in which the FTP access command, user name and password are transmitted. Once FTP access is established, a "get" command is issued in step 94 to retrieve the file named "filename" that had been previously stored in the intermediate file storage of the Web server. It is understood that this sequence of steps can be executed by the operator at the remote unit 10 or by the fleet owner/operator at the central office 30, depending upon which party is receiving information. In the illustrated embodiment, the commands are being executed by the remote interface device 20.

In the next step 96, the information in the file "filename" is received by the interface device 20 and passed to local memory 23. A conditional step 98 can be provided to determine whether the "get" command has been executed, meaning that the file transfer has been completed. If the file transfer is incomplete, an error message is sent in step 100 to the operator so that another attempt to obtain the file can be made. At this point, the routine can be ended in step 102, or control can be passed back to step 92 to issue additional commands to access and download the file "filename" from the intermediate file storage 42.

If the file transfer or download is successful, the Internet connection can be closed at step 104. Software within remote interface device 20 can then convert the FTP protocol information in the file "filename" to a format that is usable by the microprocessor 17. For example, "filename" can be converted from parallel to serial form for transmission on data bus 19 to the microprocessor 17. Once the information has been converted, a command is issued in step 108 to the microprocessor to receive the incoming information. This information is downloaded in step 110 to the memory 18 of the microprocessor, and the series of commands ends at step 112.

Figure 5:
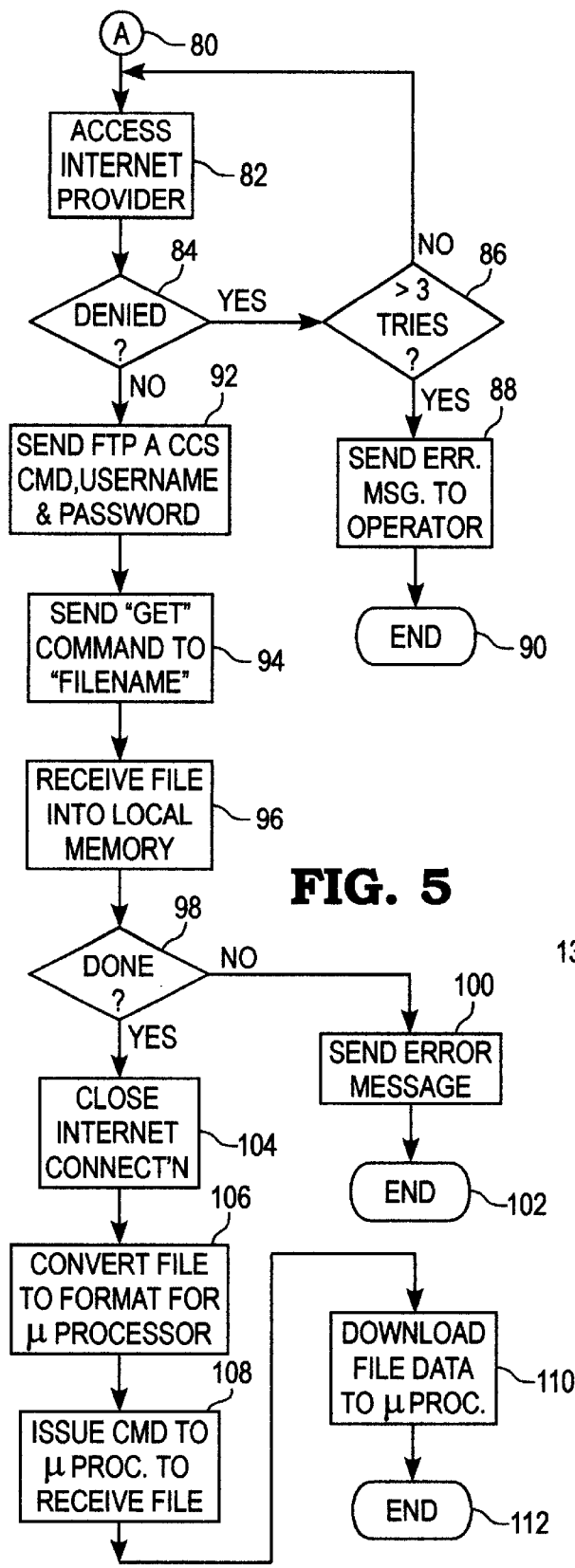
FIG. 5 is a flow chart showing the steps in the protocol for downloading information from the intermediate storage using the FTP protocol format.

As mentioned previously, the sequence of steps illustrated in the flowcharts of FIGS. 4 and 5 concern the use of an FTP format for transfer of data. It is understood that the specifics of the FTP data transmission can be transparent to the operator of the remote unit 10 or the central office 30. From the perspective of the operator, the file transfer can be accomplished through a web page for the vehicle fleet that is maintained by the Web server. As discussed above, this web page can allow the remote unit operator to select file transmission or file download. It is further understood that certain commands shown in the two flowcharts can be implemented through the web page in accordance with known Internet access and file downloading techniques. The web page can include certain web links to routines that automatically generate the FTP transfer commands once the desired file is identified by the operator.

Figure 6:
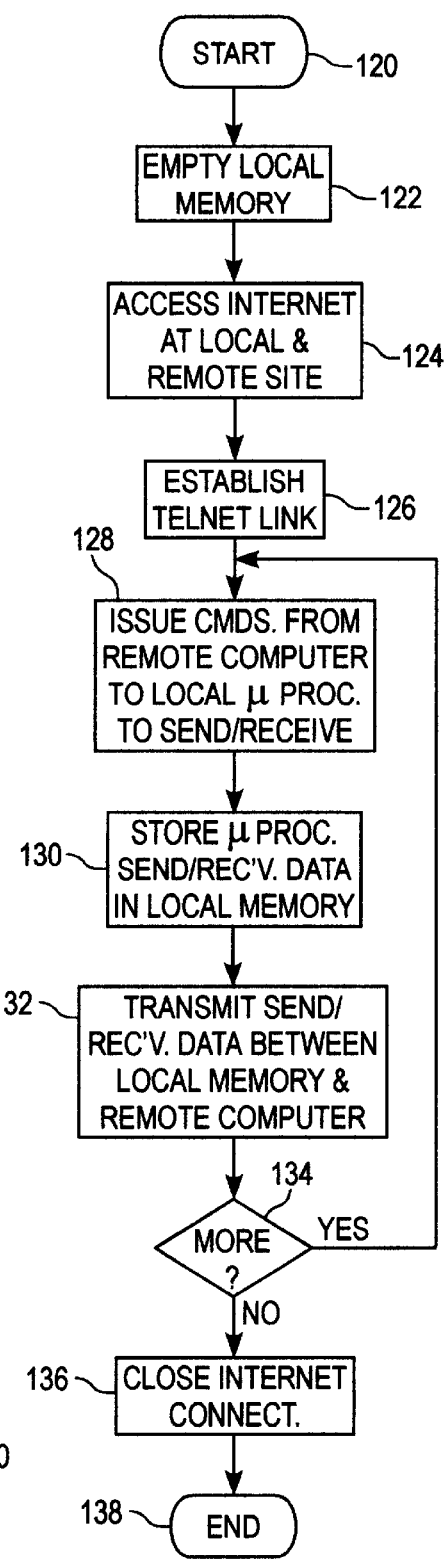
FIG. 6 is a flow chart of steps for downloading/uploading information using a Telnet link.

Under certain conditions, more direct access to the microprocessor 17 of the remote unit 10 may be desirable. In accordance with a further embodiment of the invention, the Internet is used to link the remote unit interface device 20 with the PC 32 at the central office 30. This link can be established according to steps shown in the flowchart of FIG. 6. After the start 120, the local memory 23 of the remote interface device 20 is emptied to receive files or data from either the microprocessor or the PC 32. The Internet is accessed in step 124 at both the remote unit 10 and the central office 30. A Telnet link is established in step 126. The Telnet link is a well-known protocol within the Internet and World Wide Web for linking two distant computers together.

In step 128, commands are issued from the central office PC 32 that are transmitted to the remote interface device 20. These commands can direct the interface device 20 to issue further commands to the microprocessor 17 to send or receive data. In the next step 130, this data is transferred from the PC 32 at the central office 30 into the local memory 23 of the remote interface device 20. Commands can then be issued from the PC 32 to the interface device 20 to direct the device to send the data from the local memory 23 to either the microprocessor 17 or the remote PC 32, depending on the direction of file transfer. For example, if data is being uploaded from the remote microprocessor 17, then step 132 will be executed to direct the remote interface device 20 to transmit the information back to the PC 32. On the other hand, if upgraded data or application software is being conveyed to the remote unit, the remote interface device 20 can be appropriately instructed.

In the conditional step 134, it is determined whether the remote access session is complete and if so, the Internet connection is closed in step 136 and the routine is terminated in step 138. If additional commands are to be executed, control passes back to step 128. For example, the remote unit may be accessed to first download performance data from the microprocessor 17. This performance data can then be evaluated by the fleet owner/operator at the central office 30. Depending upon the outcome of this evaluation, new operating data or application software may be downloaded to the remote microprocessor 17.

It is contemplated that the Telnet link can also be established via the fleet web page. Of course, coordination between the operator of the remote unit 10 and the fleet central office 30 is necessary so that the remote microprocessor 17 can be directly accessed.

In a further feature of the invention, the remote interface device 20 can include application software to effect the download of data and application software to the microprocessor memory 18, such as implemented in step 110 of the flowchart shown in FIG. 5. In accordance with this feature, the software routine depicted in the flowchart of FIG. 7 starts at step 140 and in the next step 142 receives the transmitted information within the reception interface 22 of the remote interface device 20. This information can then be stored within the local memory 23.

Preferably, a file identification protocol is implemented that identifies the transferred information as either data or application software. For example, the information can include an identification bit that is a binary "0" if the following bit stream is data, or a binary "1" if the bit stream is application software. Thus, in the conditional step 144 a determination is made whether the received information is either application data or application software.

If the bit stream corresponds to data, the remote interface device 20 determines the appropriate destination for the data in step 146. In this step, the interface device 20 determines at which memory location the data should be stored, depending upon where the microprocessor 17 algorithms look for the data. This destination information can be stored in a memory map within the remote interface device 20. Alternatively, the bit stream associated with the data as it is transmitted and received over the Internet can include the specific destination information. In that case, the interface device 20 is directed to read the appropriate memory location information from the incoming bit stream. Once the proper destination has been established, the data is stored in step 148 within the microprocessor memory 18.

In the preferred embodiment, a data change flag is set at step 150. This flag indicates that the specific piece of application data was modified. This flag can serve as a check by the fleet owner/operator that the remote unit operator is following fleet guidelines in downloading necessary information from the fleet central office 30. Preferably, this data change flag is maintained within the microprocessor memory 18. In this way, the information can be readily accessed through a hand-held unit that might be traditionally associated with the controller, such as where the microprocessor 17 is part of an ECM. In addition, a data change indicator can be transmitted from the remote unit 10 to the intermediate file storage 42 over the Internet. This data change indicator can be coded to the specific remote unit so that the fleet operator can download the indicator to verify that the specific remote operator has properly received the data changes.

Figure 7:
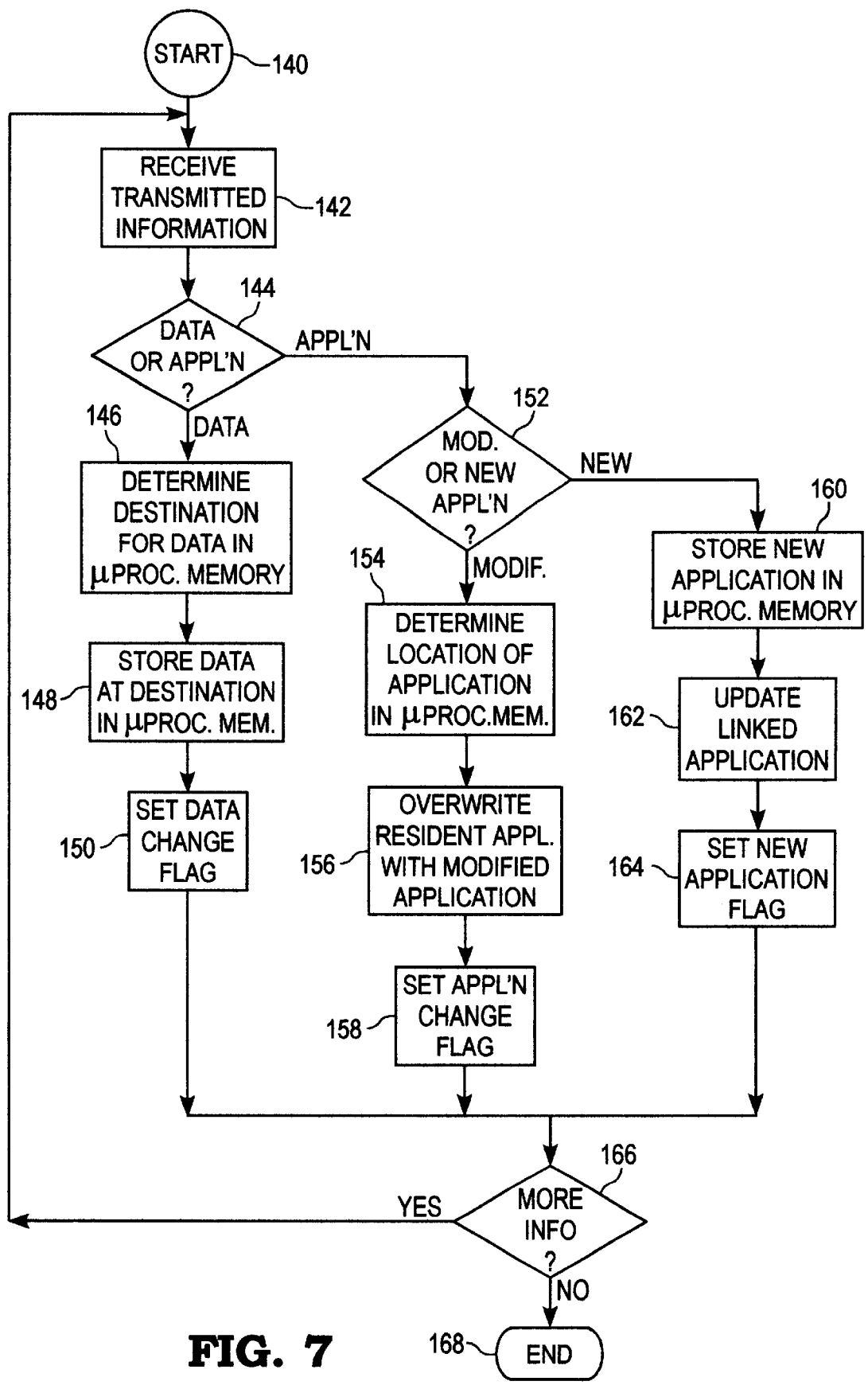
FIG. 7 is a flow chart of steps executed at the remote machine for incorporating downloaded information to the machine controller.

Referring back to the conditional step 144 in FIG. 7, if the incoming information is application software, control passes to the conditional step 152. In this step, it is determined whether the information is a modification of an existing application or an entirely new application. If the information is simply modifying an application already stored within the microprocessor 18, the location of the application is determined in step 154 by the remote interface device 20. Again, this location can be maintained in a memory map stored in the local memory 23 of the interface device 20, or attached as a bit stream to the information transmitted and received over the Internet.

Once the appropriate location of the modified commands of the application software has been established, the information for those commands is overwritten in step 156. As with the change of data, a flag is set in step 158 indicating that the particular application software within the microprocessor 17 has been modified. Similarly, an application change indicator can be returned to the intermediate file storage for review by the central office operator.

Returning to the conditional step 152, if an entirely new application is being conveyed, control passes to step 160. In this step, the new application is stored within the microprocessor memory 18. Of course, simply storing the application in memory does not integrate the new application into the existing machine control algorithms implemented by the microprocessor 17. Thus, in step 162, the linked or affiliated applications already existing in the microprocessor 18 are updated. For example, if the new application includes a series of commands to limit the idle time of an engine, such as engine 12, modification would be required to the existing applications that control the idle speed of the engine. Thus, a change to or an addition to the basic idle speed routine within the ECM would be necessary for access to the new idle limiting routine. In some cases, only one existing application may be linked to a new application so that the changes are minor. On the other hand, more involved applications may require changes to several linked applications. Preferably, the application linking information is also transmitted with the new application software conveyed over the Internet connection. As with the previous branches of the flowchart shown in FIG. 7, a flag is set indicating that a new application has been added to the microprocessor 17.

Once the steps of each branch have been completed, a conditional step 166 determines whether more information is being transmitted. This conditional step can involve interface with the operator of the remote unit 10, or can be automatic. In the latter case, the fleet operator may have a sequence of discrete information packets that must be downloaded by a particular remote unit 10. Thus, this consecutive downloading can be "hardwired" into the software executed in conjunction with the fleet web page, so that intervention by the remote unit operator is not required. Once all of these steps are complete, the sequence of steps terminates at step 168. It is understood that the steps in the flowchart of FIG. 7 can be executed at any time after the information has been downloaded over the Internet. In other words, the steps do not have to be executed immediately with the downloading of the information to the local memory 23 of the remote interface device 20. Instead, the interface device 20 can give the remote operator an opportunity at the starting step 50 shown in FIG. 4 to bypass the Internet access routines and perform various local routines.

In the illustrated embodiments, the communication link between the remote unit 10 and the Internet provider 40 is established via a cellular telephone link. Of course, other wireless links are contemplated, such as short-range RF and satellite link. In addition, in another specific embodiment, direct connection to a ground-based network can be established. For example, where the remote unit 10 is a long-haul vehicle, a direct link can be established with appropriate hardware mounted within a fueling island of a vehicle service station. The fueling island can include the necessary hardware and software to establish connection to an Internet provider. In this case, then the communications module 25 and device 28 can be eliminated from the remote vehicle 10 and incorporated into the fueling island. An output port can be established to the remote interface device 20 that is externally accessible. For example, a cable can be connected between compatible jacks on both the vehicle 10 and the fueling island. The cable interface can include J1587 or J1708 ports, for example. With this approach, the hardware costs of the communications equipment for the remote vehicle 10 are reduced. One drawback, however, is that communication is limited to fueling islands at service stations so that the upload and download of information cannot occur at any location throughout the country. On the other hand, this limitation may not be extremely significant to the vehicle operators, since any changes to the ECM are better accomplished when the vehicle is being serviced.

In the illustrated embodiments, only one machine is identified at a particular remote unit 10. However, in some cases, multiple machines may be associated with a single unit. For example, if the unit is a truck, the remote machines can include the internal combustion engine, the electronic transmission, and possibly a refrigeration unit being hauled by the truck 10. In this case, all three machines will have their own controllers and preferably their own microprocessors. Each of these microprocessors can be linked to a single remote interface device 20. A uniform standard for addressing each of the individual remote machines can be established so that the remote interface device 20 knows which machine is to send and/or receive information from the fleet owner/operator. It is further contemplated that each of the individual machines may require access to different web sites. For example, the engine manufacturer, the transmission manufacturer, and the producer of the refrigeration unit may maintain their own web site with information specific to the machines that they produce. In this instance, then, the specific fleet owner/operator need not be aware of all upgrades and changes to the individual machine elements in the remote units 10.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A method for modifying information used by a machine controller for a machine remote from a central site, the information including data and/or application software used by the machine controller to control the operation of the machine, said method including the steps of:

from the central site, accessing the World Wide Web (WWW);

from the central site, storing modification information in an intermediate digital file storage through the World Wide Web, the file storage being remote from both the central site and the remote machine;

from the remote machine, accessing the WWW at a time independent of the access from the central site;

from the remote machine, accessing the intermediate digital file storage through the WWW and downloading the modification information from the file storage; and modifying the information used by the machine controller in accordance with the modification information so that the machine controller controls the operation of the machine using the modification information.

2. The method for modifying information used by a machine controller according to claim 1, wherein:

the storing step includes converting the information to a WWW file transfer protocol;

the downloading step includes converting the downloaded information to a format readable by the machine controller; and the modifying step includes storing the converted downloaded information in a memory of the machine controller.

3. The method for modifying information used by a machine controller according to claim 1, wherein the modifying step includes:

determining a location in a memory of the machine controller for the modification information; and changing the data at the location in accordance with the modification information.

4. The method for modifying information used by a machine controller according to claim 1, wherein the modifying step includes:

determining a location in a memory of the machine controller for software commands to be changed by the modification information; and overwriting the software commands at the location in accordance with the modification information.

* * * * *